United States Patent [19]

Halpern

[11] 4,224,261
[45] * Sep. 23, 1980

[54] METHODS OF FABRICATING MICROSPONGE DEUTERATED INITIATED HYDROCARBON POLYMER TARGET WHICH EMIT NEUTRONS WHEN IRRADIATED BY HIGH ENERGY BEAMS

[75] Inventor: Gerald M. Halpern, Sommerville, N.J.

[73] Assignee: The University of Rochester, Rochester, N.Y.

[*] Notice: The portion of the term of this patent subsequent to May 30, 1995, has been disclaimed.

[21] Appl. No.: 841,171

[22] Filed: Oct. 11, 1977

[51] Int. Cl.² .................. B29C 23/00; B29D 27/00
[52] U.S. Cl. .......................... 264/15; 176/1;
   176/67; 204/159.2; 264/22; 264/41; 264/DIG. 13; 521/64
[58] Field of Search ............... 264/DIG. 13, 22, 41, 264/15, 51; 176/1, 67; 204/159.2; 521/64

[56] References Cited

U.S. PATENT DOCUMENTS 4,092,381  5/1978  Halpern et al. ............. 264/DIG. 13

OTHER PUBLICATIONS

Wilzbach, Kenneth B., "Tritium–Labeling by Exposure of Organic Compounds to Tritium Gas," in *American Chemical Society Journal*, vol. 79, Feb. 20, 1957, p. 1013.
Friedman, W. D., G. M. Halpern and B. A. Brinker, "Target Fabrication and Positioning Techniques for Laser Fusion Experiments," in *Rev. Sci. Instrum.*, vol. 45, No. 10, Oct. 1974, pp. 1245–1252.
McNally, J. Rand and R. D. Sharp, "Advanced Fuels for Inertial Confinement," in *Nuclear Fusion*, vol. 16, No. 5, Nov. 1976, pp. 868–870.

*Primary Examiner*—Philip Anderson
*Attorney, Agent, or Firm*—Martin LuKacher

[57] ABSTRACT

Targets for high energy beams, such as laser beams, produced in laser fusion apparatus are described. The targets are porous spheres of deuterated hydrocarbon material, particularly deuterated polyethylene. The spheres are small and have diameters in the range of 50 to 300 microns. Higher neutron yields are obtained from these targets than from solid targets of similar materials, (viz., spherical targets of much higher density). Methods of fabricating the targets by forming them into solid spheres, cross linking their molecules and causing them to swell such that the resultant targets have a microscopically small sponge-like structure, are also described. These micro-sponge targets may be treated by being exposed to tritium gas so as to undergo tritium deuterium exchange which is of enhanced efficiency by virtue of their porous, sponge-like structure. The porous sponge-like targets of deuterated, tritiated material may be stored under liquid to enhance their stability by absorption of their own beta radiation.

4 Claims, 3 Drawing Figures

METHODS OF FABRICATING MICROSPONGE DEUTERATED INITIATED HYDROCARBON POLYMER TARGET WHICH EMIT NEUTRONS WHEN IRRADIATED BY HIGH ENERGY BEAMS

The present invention relates to targets for high energy beams which are generated in thermo-nuclear apparatus, such as lasar fusion apparatus and to methods of fabricating such targets.

The invention is especially suitable for use in providing lasar fusion targets. The structure of these targets is such that their implosion dynamics during interaction with a pulse of laser radiation more readily obtains thermo-nuclear burn conditions than is the case with conventional targets.

Conventional lasar fusion targets are in the form of solid spherical bodies of deuterium or deuterium containing compounds. Such targets are described in an article by W. D. Friedman, G. M. Halpern and B. A. Brinker, entitled "Target Fabrication and Positioning Techniques for Laser Fusion Experiments", which appeared in the Review of Scientific Instruments, Volume 45, No. 10, October 1974, pages 1245 to 1252. Reference may be had to the aforementioned article and to an article by J. Soures, L. M. Goldman and M. Lubin, entitled "Short-Pulse Laser Heated Plasma Experiments" which appeared in "Nuclear Fusion" Volume 13 (1973) pages 829 to 838; and to M. J. Lubin, U.S. Pat. No. 3,723,246, issued Mar. 27, 1973, for descriptions of laser fusion apparatus in which both solid targets and targets provided by this invention may be used.

The following United States patent applications, which are assigned to the same assignee as this application, are related to this application in that they are concerned with targets which are adapted for use in laser fusion and the like apparatus. The applications are: Ser. No. 479,921, filed June 17, 1974 in the name of Gerald M. Halpern and Yehuda Paiss; and Ser. No. 547,143, filed Feb. 5, 1975 in the name of Russell R. Chianelli, now U.S. Pat. No. 3,987,590. Publications and patents referred to and cited in the Halpern and Paiss application may also be referred to for further information respecting laser fusion and the like apparatus and targets for use therein.

It is an object of this invention to provide improved targets which have higher neutron yields than conventional targets when irradiated by high energy beams, such as laser beams and also to methods for fabricating such improved targets.

It is another object of the present invention to provide improved targets which are especially adapted to be heated and compressed to obtain thermonuclear conditions when high energy beams, such as laser beams, are incident thereon, and also to methods of fabricating such improved targets.

It is a further object of the present invention to provide improved thermonuclear fuel elements which are especially adapted for use in laser fusion apparatus and to methods of fabricating such fuel elements.

It is a still further object of the present invention to provide improved targets from which high temperature plasmas can be obtained when heated by laser radiation and also to methods for fabricating such improved targets.

It is a still further object of the present invention to provide improved targets of deuterated hydrocarbon material for use in laser fusion apparatus and to methods of preparing such targets.

It is a still further object of the present invention to provide improved targets which are of porous structure and spherical shape from deuterated hydrocarbon materials, such as deuterated polyethylene, and to methods of fabricating such targets.

Briefly described, a target provided by the present invention is a ball, preferably spheroidal or spherical in shape, of deuterated hydrocarbon material, preferably a polymer such as deuterated polyethylene, which may be of the type which is commercially available or which may be fabricated in accordance with well known polyethylene fabrication techniques. The targets themselves are exceedingly small, say in the range of 50 to 300 microns in diameter. Notwithstanding their small size, they have a structure extending inwardly from the surface thereof which is porous and sponge-like. The porous sponge-like structure may be a shell about a core of the body which is either solid or completely hollow. The body may have the porous sponge-like structure throughout. For a given amount of energy (e.g., laser pulse energy of the laser beam which is incident on the target as in a laser fusion apparatus) the targets compress and have improved implosion dynamics over solid spheres and produce higher neutron yields than such solid spheres.

Briefly described the method of producing such improved targets includes the forming of the deuterated hydro-carbon material (viz., deuterated polyethylene) into solid bodies which may be spheroidal or spherical in shape. The molecules of the material of these bodies are then cross-linked as by being irradiated with gamma rays. Then the cross-linked bodies are increased in size by causing these bodies to swell, with the aid of a fluid. The fluid is then removed (say by vacuum drying). The resultant bodies have the aforementioned porous sponge-like structure.

In accordance with another embodiment of the invention a target may be deuterated, tritiated hydrocarbon material, preferably a polymer such as deuterated, tritiated polyethylene; i.e. $(CDT)_n$. This material, more simply denoted CDT, possesses a high atomic faction fusile components and provides a target which is a source of both deuterium and tritium which is more active than deuterium itself as a thermonuclear fuel element. The CDT targets have the same structures as the above described targets of deuterated hydrocarbon material; i.e., they are exceedingly small, porous and sponge-like and may be porous and sponge-like throughout, or their porous-spongelike region may be a shell about a core which is solid or hollow.

The method of producing such CDT targets starts with the deuterated hydrocarbon material (viz., deuterated polyethylene) and forms the material into bodies having the porous, sponge-like structure as heretofore explained. Then tritium is exchanged with a portion of the deuterium, as by placing the porous sponge-like bodies of deuterated polyethylene in an atmosphere of tritium. Because of the porous sponge-like structure the tritium gas penetrates the bodies for effective exchange efficiency. Self-absorption of beta radiation which would affect the physical and chemical stability of the CDT targets is reduced by storing the CDT targets under liquid (e.g. water) which penetrates their porous, spongelike structures and absorbs much of the self radiation. The CDT targets are, by reason of the porous sponge-like structure, therefore improved over other tritiated targets from the point of view of fabrication, storage (viz, life) and handling.

The foregoing and other features, objects and advantages of the invention as well as the best mode for practising and carrying out the invention and the presently preferred embodiments thereof will become more apparent from the following description and the accompanying drawings in which.

Figure 1:
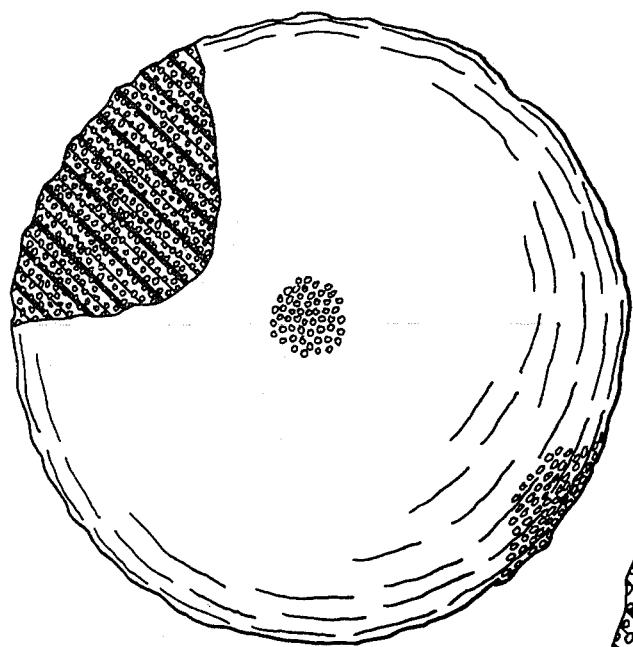
FIG. 1 is a perspective view, broken away to show the cross-sectional structure thereof, of a target which is provided in accordance with the invention.

FIG. 1 illustrates a target in the form of a sphere of deuterated polyethylene which, instead of being solid, has a porous sponge-like structure throughout. The sphere may be of a diameter in the range of about 300 microns and by virtue of the porous structure thereof has a density of from 0.1 to 0.2 grams per cubic centimeter. This is approximately ten to twenty percent of the density of solid polyethylene. Inasmuch as the pores in the structure are microscopic in size the target may be referred to as a "microsponge" target.

The target may be located at the focus of one or more lasar beams in laser fusion apparatus of the type described in the above referenced articles, and/or in the Lubin patent. When laser pulse energy is incident on the target the target implodes and compresses. The result is a laser fusion reaction since the target material is heated to thermonuclear burn condition. Neutrons result from the reaction. By virtue of the structure of the target, the neutron yield may be one or two orders of magnitude greater than the yield obtained from a solid sphere of like diameter for a like amount of laser pulse energy, (viz., an increase of a factor of about 100 neutron yields may be realized with a microsponge target as shown in FIG. 1).

Figure 2:
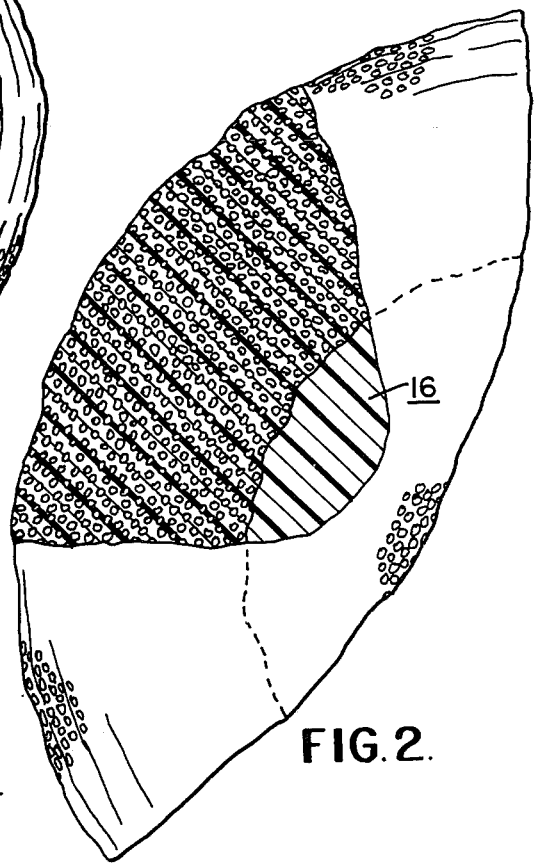
FIG. 2 is a view similar to FIG. 1 of a target provided in accordance with another embodiment of the invention.

FIG. 2 illustrates a microsponge target of similar size and shape as the target shown in FIG. 1. It will be noted, however, that only the outer shell 14 of the target is of the microsponge structure. The target has a core 16 which is solid. Both the shell 14 and the core 16 are of the same deuterated hydrocarbon material (e.g., polyethylene).

Figure 3:
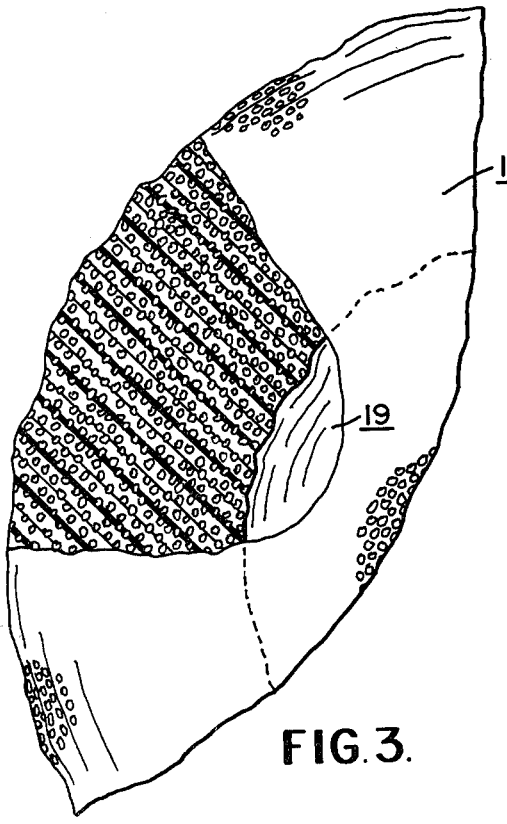
FIG. 3 is a view similar to FIG. 1 of a target provided in accordance with still another embodiment of the invention.

FIG. 3 shows a target of similar size and shape to the target shown in FIGS. 1 and 2. The target has an outer shell 18 of microsponge structure and a core 19 which is hollow. The hollow core provides a target which can be even more compressible and may have better implosion dynamics than the structure which is porous (microsponge) throughout, as shown in FIG. 1 or has a microsponge outer shell 14 and a solid core 16.

To fabricate targets such as shown in FIG. 1, the starting material used may for example be commercially available deuterated linearpolyethylene. A preferred material is polyethylene having a low molecular weight such that it flows at temperatures just above its melting point. Polyethylene having a melt index of from about 10 to about 15 may be used. The deuterated polyethylene which is obtained from Bendix Corporation, Kansas City Division, Kansas City, Mo., 64141, having a melt index of 14.4 is suitable, by way of specific example.

The polyethylene polymer is then ground to a fine powder preferably by a micro blender, such as Model No. 4300 manufactured by Cole-Parmer of Chicago, Illinois, which is chilled with liquid nitrogen so as to make the polymer essentially brittle and enhance the pulverization thereof into fine powder. The material is pulverized to desired size (e.g., from 25 to 200 microns in diameter) by utilizing a sufficiently long grinding time in the micro blender an then sieving the particles which are below the maximum size desired (e.g., of about 200 microns maximum diameter).

The powder is then heated in a vessel containing silicone oil, Dow-Corning 20 Centistoke silicone oil for example, which is maintained at a temperature of about 150° C., for about ten minutes. The vessel containing the oil is gently agitated to minimize agglomeration of the particles. The vessel is then quenched by placing it in ice (ordinary wet ice). The resultant bodies are spherical in shape (spheres or spheroids) due to their melting in the silicone oil. Accordingly, the powder particles are formed into hard or dense spheres of from about 25 to about 200 microns in diameter. These bodies are washed in order to remove any residual silicone oil which may remain thereon. Washing in a solution of trichloroethylene, chloroform and methanol is preferably used to remove the residual silicone oil.

A batch of spherical bodies is then sealed in an evacuated glass tube and exposed to a flux of gamma rays. For example one megavolt (MeV) gamma rays derived from a cobalt 60 radiation source may be used. Dosages in a range from about 10 to about 40 megarads (MRad) is suitable, with a dosage in the range of from 20 to 30 MRad being preferred. The density of the resulting targets is a function of dosage, with lower dosages providing lower density and higher dosages providing higher density. Thus, the density can be continuously controlled ranging from about 10 to 100% of the bulk density value of the starting material.

In the event that targets having a hollow core such as shown in FIG. 3 are desired, the cross linking of only the outer layers of the spherical bodies is accomplished by using lower energy radiation. For example, 50 KeV electronis from an electron gun source.

The crosslinked spheres are then removed from the glass tube and caused to be increased in size by swelling to about 1½ to 2 times their original diameters. Swelling may be carried out by means of a fluid which diffuses into the bodies, dissolves the uncrosslinked component and expands the remainder. For example, a bath of hot solvent may be used to cause the crosslinked spheres to swell. The temperature of the bath is preferably from about 90° C. to about 120° C. in order to obtain the swelling without softening of the spheres and agglomeration or deformation thereof. The solvent may for example be para-xylene which is maintained at a temperature of about 105° C. A preferable temperature range for para-xylene is 100° to 110° C. The crosslinked spheres are immersed in the bath and maintained there for about two hours. The temperature of the bath and the immersion time determines the extent to which the solvent penetrates and diffuses into the spherical body. In the event that a low density shell surrounded by a high density core is desired (viz., the structure of the target shown in FIG. 2), it is desired that the solvent diffusion be incomplete and extend only into the outer layer of the spherical body. In order to obtain such incomplete diffusion and swelling of the outer shell of the bodies, swelling times of less than one hour can be used. The ratio of diameter of shell to diameter of core is controlled by both swelling time and temperature and may be selected accordingly.

The structure shown in FIG. 3 is obtained by virtue of the dissolution of the uncrossed linked core of the bodies by the solvent, while the crosslinked shell is only partially dissolved in a manner to form the highly porous micro structure common to the target shown in FIGS. 1, 2 and 3.

After the swelling time has expired, the vessel containing the bath is rapidly quenched by immersion in wet ice. This rapidly cools the bodies below their crystalization temperature and freezes in the highly porous micro structure. The excess solvent is then drained off and the spherical bodies are vacuum dried at room temperature for several hours to remove any residual solvent.

When the particles are dried they exhibit a snowball-like appearance due to light scattering from the highly porous micro structure. They are soft to the touch, in sharp contrast to solid spherical bodies of similar material. The diameters of the bodies vary from about 50 to 400 microns while the pores of cells which make up the micro structure are typically one micron or smaller in size. The densities of the microsponge targets may range from about 0.13 to 0.23 grams per cubic centimeter as compared to solid deuterated polyethylene spheres (before swelling) which is about 0.96 grams per cubic centimeter.

In the event that targets of deuterated, tritiated polyethylene are desired, the particles are placed in an atmosphere of tritium gas, preferably under pressure. The exposure results in tritium exchange for deuterium. Such exchange may involve the so-called Wilzbach exchange (see K. E. Wilzbach, J. Amer. Chem. Soc., 79, 1013 (1957)).

By way of example, the pressure of the tritium gas may be two atmospheres and the exchange allowed to take place over two weeks. The resultant material has approximately the stoichiometry ($D_{1.95}T_{0.05}$). Different gas pressures and/or exposure times may be used to vary the tritium content of the bodies. During the exposure time the bodies may be gently agitated.

Since the deuterated polyethylene bodies undergoing the exchange are porous and sponge-like, exchange efficiency is enhanced.

In order to reduce self-absorption of the beta radiation from the CDT particles due to bond scission (viz, self dosage of beta radiation which would liberate deuterium and tritium from the particles) they are stored under liquid. Such liquid is suitably water, although oil (ordinary machine oil or silicone oil) may be used. The liquid penetrates the porous spongelike bodies and absorbs the beta particles thereby reducing and slowing radiolytic damage to the CDT material itself. The bodies are removed from the liquid when needed for use as targets in the laser fusion apparatus.

From the foregoing description it will be apparent that there has been provided improved targets for use in laser fusion apparatus or like apparatus which uses high energy beams in order to produce plasmas and/or yield neutrons as a result of interactions of the particles with the beams. The balls of microsponge material are thus improved laser fusion targets. Variations and modifications in the targets themselves as well as in the methods of fabrication as described herein, within the scope of the invention, will undoubtedly suggest themselves to those skilled in the art. Accordingly, the foregoing description should be taken merely as illustrative and not in any limiting sense.

What is claimed is:

1. A method for the fabrication of elements, for use as targets for a high energy beam, and which provide neutrons by interaction with said beam, said method comprising the steps of
   (a) forming deuterated hydrocarbon polymer material into solid bodies which are of sizes which are less than about 300 microns diametrically,
   (b) cross linking the molecules of the material with radiation,
   (c) increasing the size of said linked bodies while reducing the mass thereof with the aid of a fluid which is a solvent for the uncross linked portions of the material and a swelling agent for the cross linked portions thereof which causes said bodies to partially dissolve and to swell, thereby providing said bodies with a micro-sponge structure of cells of a size which does not exceed about one micron, said micro-sponge structure bodies providing said elements, and
   (d) exposing said micro-sponge structure bodies to tritium gas whereby to exchange a portion of the deuterium of said material for tritium such that said bodies are of deuterated tritiated polymer material.

2. The invention as set forth in claim 1 wherein said gas is under pressure greater than an atmosphere.

3. The invention as set forth in claim 2 wherein said exposure is carried out for a period of time including a number of days.

4. The invention as set forth in claim 1 further comprising the step of storing said micro-sponge deuterated, tritiated material bodies under liquid.

* * * * *